Patented May 21, 1940

2,201,347

UNITED STATES PATENT OFFICE 2,201,347

METHOD FOR THE MANUFACTURE OF HYDROGENATION PRODUCTS OF FURFUROL

Wilhelm Rittmeister, Dessau, Anhalt, Germany, assignor, by mesne assignments, to "Patchem A.-G. Zur Beteiligung An Patenten Und Sonstigen Erfindungsrechten Auf Chemische Verfahren", Zurich, Switzerland, a corporation of Switzerland No Drawing. Application May 7, 1937, Serial No. 141,306. In Germany November 14, 1936

6 Claims. (Cl. 260—345)

It has been found that the hydrogenation of furfurol, while in the vapor phase, to furfuryl-alcohol, tetrahydro-furfuryl-alcohol and to pentandiols can be performed in a particularly smooth manner and with nearly theoretical yields by conveying the furfurol in vapor phase over solid catalysts together with a large excess of hydrogen or hydrogen-bearing gases at temperatures lying above 100° C. and preferably between 130 and 230° C. In the hydrogenation process it is preferable to use super-atmospheric pressure. Suitable pressures are those from 20 up to 500 atmospheres but preferably those from 20 to 250 atmospheres are employed. The quantity of hydrogen found suitable for the process may be varied from 20 to 500 times the theoretically necessary amount. The excess of hydrogen is in any case to be large enough to allow it to draw off the very remarkable heat of the reaction developed during the hydrogenation of the furfurol without allowing an appreciable rise in the temperature of the catalyst.

Among the different sorts of catalysts we may use anyone specified as being suitable for the furfurol hydrogenation in the liquid phase such as nickel, nickel-chrome, nickel-copper, copper, copper-chrome, copper-zinc, cobalt, cobalt-chrome, cobalt-copper, cobalt-copper-chrome, nickel-copper-chrome, nickel-copper-manganese, nickel-copper-iron catalysts and the like, either in the presence or in the absence of a carrier for the catalyst. It may also be stated, that for the hydrogenation according to the present method the catalysts need not be of the same high activity as is necessary for the hydrogenation in the liquid phase. We are therefore in a position to use a simpler process of producing and reducing the catalysts. Thus, for example a nickel-copper-manganese carbonate catalyst, the power of which was insufficient for the hydrogenation of furfurol in the liquid phase, proves most apt for the hydrogenation in the vapor phase.

Since the method claimed herein is continuous it offers all the well-known advantages of continuous hydrogenation as compared with discontinuous methods.

Beyond this the new method, compared with the well-known procedures for the manufacture of tetrahydro-furfuryl alcohol and of pentandiols, shows the following considerable advantages:

When furfurol is hydrogenated in the liquid phase the reduction of aldehyde to alcohol, i. e., to the furfuryl-alcohol, which is the first occurring reaction, takes a comparatively slow course. Only when nearly all furfurol is reduced to the furfuryl alcohol will the hydrogenation of the nucleus of this product to tetrahydro-furfuryl-alcohol begin, and then it starts in a most vigorous manner and often with such violence that the heat of the reaction developed cannot be drawn off, with the result it leads to such high temperatures that it causes the formation of undesirable and sometimes even resin-like condensation products. The exothermic heat of the process will under certain circumstances increase to an explosive intensity, so that the hydrogenation of furfurol in the liquid phase is, as stated in the prior art, rather dangerous especially if performed on a large scale. Now those inconveniences are absolutely eliminated in applying the new method.

Moreover it has been found that the catalysts employed, when used in accordance with claimed methods, are more stable than in the liquid phase hydrogenation process. In the latter case the efficiency and stability of the catalysts is diminished by the absorption of high molecular and sometimes coke-like polymerization-products, whereas with the claimed method such materials, which inhibit the hydrogenation, are formed either to an insignificant degree or not at all. That is why the consumption of catalysts is appreciably reduced by the present invention, and even to a minimum in using freshly distilled furfurol for the hydrogenation, which is always preferable.

Furthermore, it has been found that a dilution of the furfurol with inert organic media and particularly with alcohols such as methanol, ethanol, isopropyl alcohol, butanol, tetrahydro-furfuryl alcohol, throughout is of great advantage. Such a dilution, on the one hand, helps to take up and to dissipate the heat of the reaction during the hydrogenation, while, on the other hand, it prevents the formation of polymerization and cleavage products. In this way the stability of the catalysts is remarkably enhanced, the output of tetrahydro-furfuryl alcohol increased, due in part to the fact that the formation of amyl alcohol is considerably diminished.

Example 1

Within one hour 8 kilograms of freshly distilled furfurol are conveyed over a nickel-copper-manganese catalyst together with 600 cubic meters of hydrogen under a pressure of 200 atmospheres and at a temperature of 165–175° C. There is obtained 8.2 kilograms of a reaction-product consisting of 88% of tetrahydro furfuryl alcohol, 4% of amyl alcohol and 8% of 1,2- and/or of 1,5-pentandiol. The reaction product is suitable for use without further working-up as a good solvent or textile medium.

Example 2

5 kilograms of furfurol and 5 kilograms of tetrahydro-furfuryl alcohol are conveyed over a nickel-chrome catalyst together with 300 cubic meters of hydrogen under a pressure of 200 atmospheres and at a temperature of 150–160° C. The thus obtained product consists of 95% of tetrahydro-furfuryl alcohol, 1% of a mixture of amyl alcohol and 4% of 1,2- and 1,5-pentandiols, respectively.

Example 3

10 kilograms of freshly distilled furfurol are conveyed over a copper-nickel-chrome catalyst together with 1000 cubic meters of hydrogen under a pressure of 100 atmospheres and at a temperature of 200° C. The thus resulting reaction product contains 60% of tetrahydro-furfuryl alcohol, 10% of a mixture of amyl alcohol and 30% of 1,2- and 1,5-pentandiols.

I claim:

1. Method for the continuous manufacture of hydrogenation products of furfurol comprising tetrahydrofurfuryl alcohol in a major proportion, characterized by the hydrogenation of furfurol in the vapor phase at temperatures between 130 to 230° C. and under a pressure of 20 to 500 atmospheres and with an excess of hydrogen amounting to 20 to 500 times the theoretical amount necessary to produce said major proportion of tetrahydrofurfuryl alcohol and in the presence of a hydrogenation catalyst.

2. Method for the continuous manufacture of hydrogenation products of furfurol in the vapor phase, characterized by the hydrogenation of furfurol at temperatures above 100° C. and at pressures between 20 to 500 atmospheres and with a high excess of hydrogen amounting to 20 to 500 times the theoretical amount necessary to produce a major proportion of tetrahydrofurfuryl alcohol in the presence of a catalyst of the group consisting of nickel, nickel-chrome, nickel-copper, copper, copper-chrome, copper-zinc, cobalt, cobalt-chrome, cobalt-copper, cobalt-copper-chrome, nickel-copper-chrome, nickel-copper-manganese, nickel-copper-iron.

3. Method for the continuous manufacture of hydrogenation products of furfurol, characterized by the hydrogenation of furfurol diluted with inert organic solvents of the group consisting of methanol, ethanol, isopropyl alcohol, butanol, and tetrahydrofurfuryl alcohol and in the vapor-phase at temperatures above 100° C. and under a pressure of 20 to 500 atmospheres and with a high excess of a hydrogen amounting to 20 to 500 times the theoretical amount necessary to produce a major proportion of tetrahydrofurfuryl alcohol in the presence of a hydrogenation catalyst.

4. Method for the manufacture of hydrogenation products of furfurol characterized by the hydrogenation of furfurol in the vapor phase by reacting freshly distilled furfurol with hydrogen in the proportion of 8 kgs. of furfurol to 600 cubic meters of hydrogen at a temperature of 165 to 175° C. and under a pressure of 200 atmospheres in the presence of a nickel-copper-manganese catalyst to obtain tetrahydro furfuryl alcohol, amyl alcohol, and pentandiol.

5. Method for the manufacture of hydrogenation products of furfurol characterized by the reaction of 5 kgs. of furfurol diluted with 5 kgs. of tetrahydro-furfuryl alcohol with 300 cubic meters of hydrogen at a temperature of 150 to 160° C. and under a pressure of 200 atmospheres in the presence of a nickel-chrome catalyst to obtain tetrahydro-furfuryl alcohol, amyl alcohol, and pentandiol.

6. Method for the manufacture of hydrogenation products of furfurol characterized by the hydrogenation of furfurol in the vapor phase by reacting freshly distilled furfurol with hydrogen in the proportion of 10 kgs. of furfurol to 1000 cubic meters of hydrogen at a temperature of 200° C. and under a pressure of 100 atmospheres in the presence of a copper-nickel-chrome catalyst to obtain tetrahydro furfuryl alcohol, amyl alcohol, and pentandiol.

WILHELM RITTMEISTER.

CERTIFICATE OF CORRECTION.

Patent No. 2,201,347.  May 21, 1940.

WILHELM RITTMEISTER.

It is hereby certified that error appears in the printed specification of the above numbered patent requiring correction as follows: Page 2, first column, lines 11 and 21, strike out the words "a mixture of" and insert the same after "of" in lines 12 and 22 respectively; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.